May 22, 1962 K. WIEBICKE ETAL 3,035,558
STARTING DEVICE FOR INTERNAL COMBUSTION ENGINES
Filed March 22, 1960 3 Sheets-Sheet 1

INVENTORS
Klaus Wiebicke
Georg Jaeckel
Horst Lachmann
BY Bailey, Stephens & Huettig
ATTORNEYS May 22, 1962   K. WIEBICKE ETAL   3,035,558
STARTING DEVICE FOR INTERNAL COMBUSTION ENGINES
Filed March 22, 1960   3 Sheets-Sheet 2

INVENTORS
Klaus Wiebicke
Georg Jaeckel
Horst Lachmann

BY Bailey, Stephens & Huettig
ATTORNEYS

AIR SWIRL

AIR SWIRL

United States Patent Office 3,035,558
Patented May 22, 1962

3,035,558
STARTING DEVICE FOR INTERNAL
COMBUSTION ENGINES
Klaus Wiebicke, Georg Jaeckel, and Horst Lachmann, Nurnberg, Germany, assignors to Maschinenfabrik Augsburg-Nurnberg, A.G., Nurnberg, Germany
Filed Mar. 22, 1960, Ser. No. 25,168
6 Claims. (Cl. 123—1)

This invention relates to a starting device for an internal combustion engine. In particular, the invention relates to a starting aid or device for an internal combustion engine in which a strong swirl of the combustion air is formed around the longitudinal axis of the engine cylinder.

In compression ignition engines having true fuel injection, as disclosed in Meurer et al. Patent No. 2,907,308 and Vogel et al. Patent No. 2,921,571, the air swirl produced in the air intake duct and passed to the engine cylinder is disadvantageous in the starting of the engine. Efforts have been made to strongly control this air swirl to keep it as small as possible during the starting of the engine. This was possible to some extent by adjusting the masked intake valves away from their swirl actuating position. Also, deflectors were used which where mounted at the entrance to or adjacent the air intake duct for directing the intake air so as to minimize the swirl ordinarily obtained. However, for ideal starting conditions, the air swirl must be spoiled so as to be substantially eliminated or destroyed.

The object of this invention is to produce a device which will substantially destroy the swirl ordinarily produced in the air intake duct or air approach passage of a fuel injection combustion engine.

In general, this and other objects of the invention are obtained by employing a generally flat disc swirl plate mounted in the intake duct so that, when in starting position, the disc blocks more than one-half of the cross-sectional area of the intake duct against the flow of intake air, that is to say, that less than one-half of the plate is cut away so that some air can flow through the duct. It is of advantage to let the air required for starting the engine flow through one or several openings formed in the control plate in the form of notches in the edge of the plate. With reference to the form of the air intake ducts from different cylinders, these openings located in the edge or near the edge of the control plate have such a configuration that, in the starting position of the plate, the air swirl normally produced in the intake duct is cut to substantially zero. These openings in the plate, along with the shape of the walls of the twisted air intake duct, create a uniform flow of air through the duct in which the air swirl is completely absent. The position of the control plate can be made responsive to the speed of the engine.

The control plate for eliminating the air swirl is located either at the entrance to the twisted air intake duct, or in the flange between the air intake pipe and the twisted air duct, or even in the twisted duct itself a short distance from the entrance to the duct.

The means by which the objects of the invention are obtained are described more fully with reference to the accompanying drawings, in which.

Figure 1:
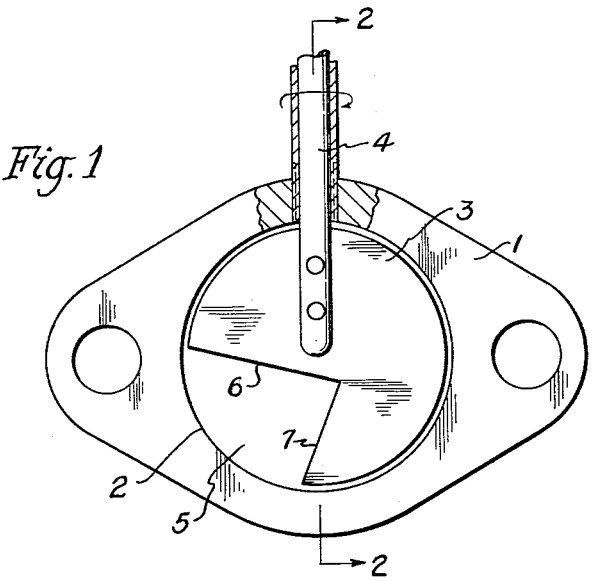
FIGURE 1 is a front view of the flanged entrance to an air intake duct or approach passageway with the control plate mounted therein.
Figure 2:
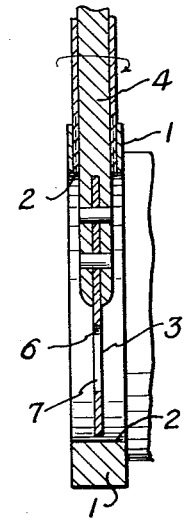
FIGURE 2 is a cross-sectional view generally on the line 2—2 of FIGURE 1.

In FIGURES 1 and 2, the flange 1 is at the entrance to the air intake duct which has an inner wall 2 enclosing the cross-sectional passage area of the duct. The new control plate 3 in the form of a flat disc is rotatably mounted by means of a shaft 4 journalled in the wall of the flange. An off-centered notch 5 bounded by the edges 6 and 7 is cut out of the plate 3, this notch being less than one-half of the surface area of plate 3 so that, when the plate 3 is in closed position, as is shown, more than one-half of the cross-sectional area of the intake duct is blocked against the flow of air.

Figure 3:
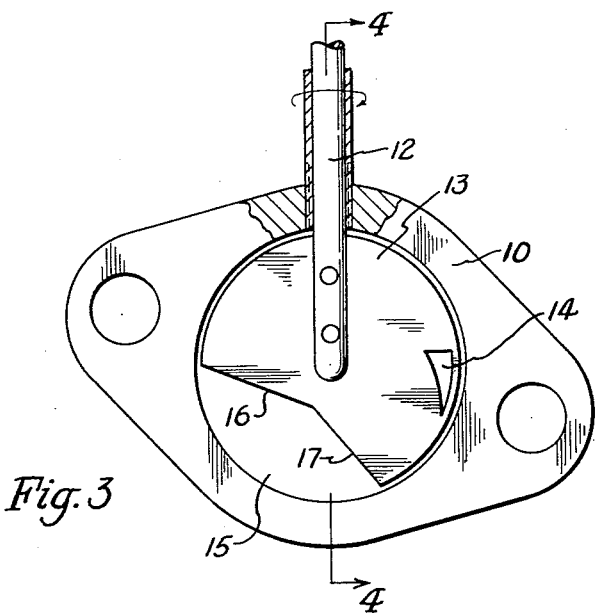
FIGURE 3 is a view similar to FIGURE 1 showing a modified form of control plate.
Figure 4:
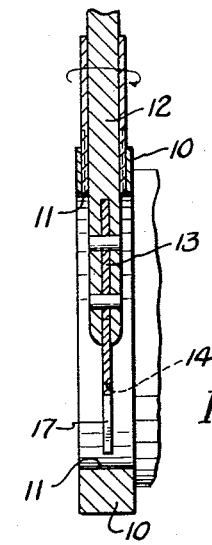
FIGURE 4 is a cross-sectional view generally on the line 4—4 of FIGURE 3.

In FIGURES 3 and 4, the intake duct is provided with a flange 10 having an inner wall 11 defining the cross-sectional opening area through the duct. Control plate 13 is rotatably mounted in the flange 10 by means of a shaft 12 rotatably journalled in the wall of the flange. Plate 13 contains a hole 14 adjacent the outer edge of the plate and a second notch 15 bounded by the side edges 16 and 17 in the edge of the plate. Again, the total area of opening 14 and notch 15 is less than one-half of the surface of the plate.

Figure 5:
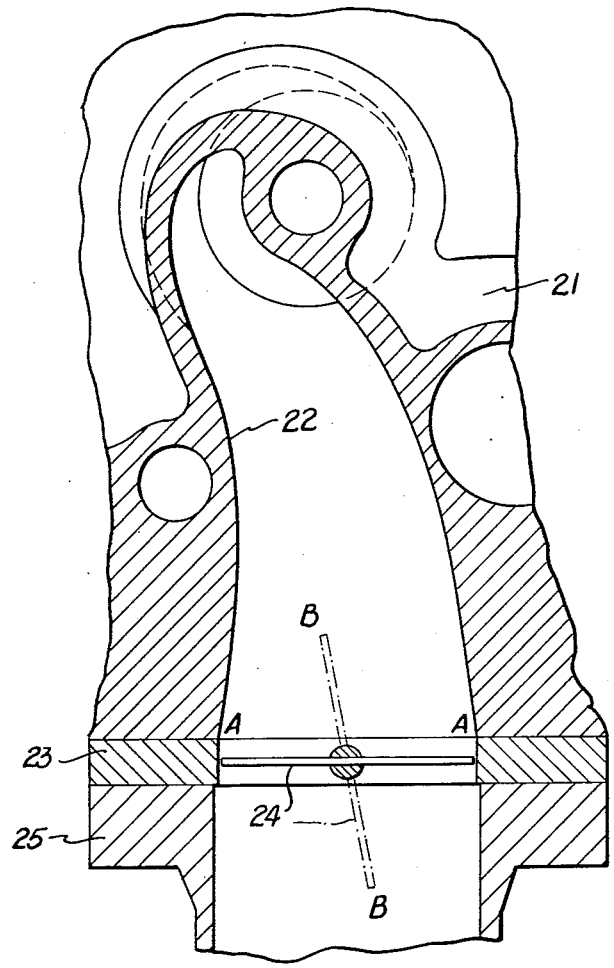
FIGURE 5 is a cross-sectional view through the air intake pipe and twisted intake duct and showing the control member mounted therein.

In FIGURE 5, the engine cylinder head 21 contains the approach passage or twisted swirl intake duct 22. The duct 22 is joined through a flange 23 containing the control plate 24 to the air intake pipe 25. The control plate 24 is closed in its position A—A, in which position the flow of air into and through the duct 22 is substantially altered so that no air swirl is created within the cylinder. Plate 24 can have the form of either plate 3 of FIGURE 1 or plate 13 of FIGURE 3. In normal running position, the plate is turned to position B—B so that air flowing through duct 22 is formed into a swirl entering the engine cylinder.

It is well known that the air inflow conditions differ for the various cylinders of a multi-cylinder engine. According to this invention, in order to make the air flow or air swirl uniform for all the cylinders, each air intake duct is provided with a control plate having air passageways therein as heretofore described. Thus, when the plate is in open position B—B, it functions as a flow rectifier for that particular intake duct. All of the control plates for the various cylinders can be operated by an actuating member common to the various plates.

According to this invention, the control plate, when in closed position, cannot only substantially eliminate the air swirl in the cylinder, but can also cause a swirl in the opposite direction in the cylinder. Furthermore, the throttling produced in the air flow by the closed position of the plate causes a high pressure drop in the intake duct which, in turn, produces a temperature rise in the air which results in an improvement of the starting conditions for the engine.

When the control plate is in open position, this plate not only allows the greatest possible air flow through the intake duct, but also functions as a guiding vane which assists in obtaining the largest possible swirl in the air as the air flows through the duct and into the engine cylinder.

Figure 6:
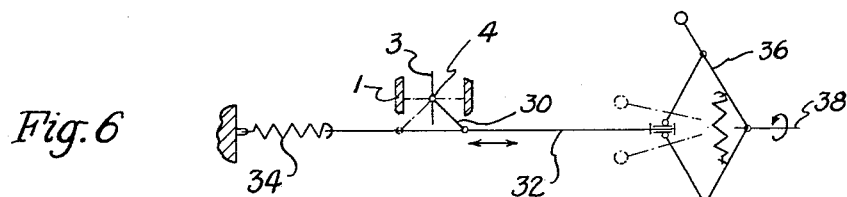
FIGURE 6 is a diagrammatic view of the valve controlled by the engine speed.

In FIGURE 6, the plate 3 is shown connected by an arm 30 to a rod 32 which has one end held by a spring 34 and its opposite end connected to a governor 36 which is connected by a shaft 38 to the engine. Before starting, spring 34 pulls rod 32 toward the left and thus rotates plate 3 into closed position. When the engine starts, the plate 3 is gradually opened as the engine picks up speed and causes the governor to pull the rod 32 toward the right. Thus the air swirl is created in the cylinders of the engine as the engine builds up to operating speed.

Figure 7:
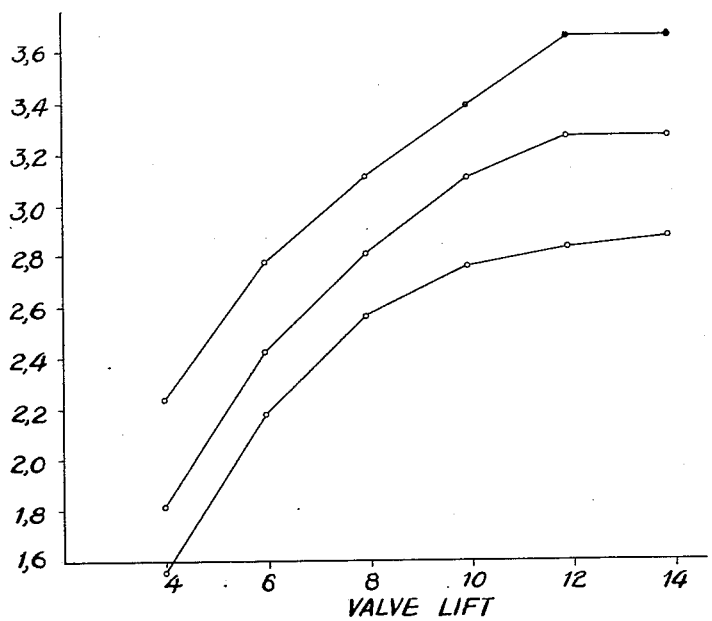
FIGURES 7 and 8 are graphs showing swirl plotted against valve lift.
Figure 8:
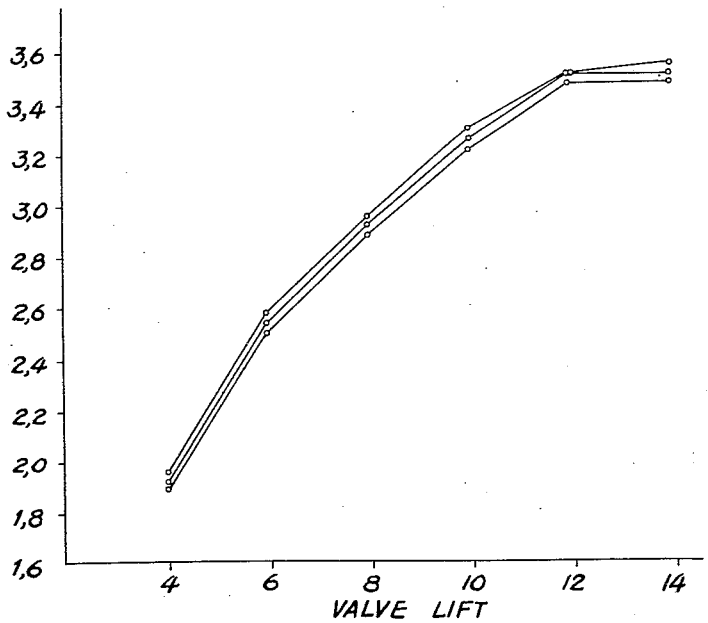

In the graphs given in FIGURES 7 and 8 the swirl $cu/ca$ is plotted as ordinate. $cu$ stands for the revolving speed of the air in the cylinder about the longitudinal axis of the cylinder at 0.7D where D is the diameter of the cylinder. $ca$ stands for the velocity of the air along the longitudinal axis of the cylinder. The valve lift is plotted as abscissa in mm.

If, for instance, the amount of swirl is measured in the cylinders of an engine which of course have identical swirl-producing inlet ducts or ports, it will be found that the swirl readings deviate only to a negligible extent from each other.

However, with the intake manifold attached the usual variations in shape of the individual bends will produce different flow conditions at the points where the air enters the swirl ports of the individual cylinders which also affect the swirl produced. The individual curves in FIGURE 7 show the magnitude of the deviations in swirl resulting from the intake manifold.

If then the control plate is fitted in the intake to each cylinder it will act as a flow rectifier when brought into its position B—B as shown in FIGURE 5 so that, as a result, the swirl intensity in the individual cylinders is influenced to have roughly the same value. The curves in FIGURE 8 represent the measurements made on 3 cylinders which, with the intake manifold in place, had the control plate adjusted for position B—B.

These measurements go to show that, in spite of the openings 5, 14 and/or 15 in the plate 3 of FIGURE 1 or plate 13 of FIGURE 3 which are important for the starting ability of the engine, the control plate offers additional advantages in that uniform flow conditions are obtained during continuous operation of the engine.

Having now described the means by which the objects of the invention are obtained,

We claim:

1. In combination with an internal combustion engine having a cylinder, an air intake duct communicating with said cylinder, and means associated with said duct and cylinder for producing a unidirectional air swirl in said cylinder around the longitudinal axis thereof, an engine starting device comprising a flat disc plate rotatably mounted in said duct from open to closed positions, and an off-centered air passage opening through said plate having an area less than one-half of the surface area of said plate so that said plate when in closed position spoils said air swirl during engine starting.

2. In the combination of claim 1, said opening comprising a notch in the edge of said plate.

3. In the combination of claim 2, further comprising a hole through said plate forming a second air passage opening.

4. In the combination of claim 3, each opening having a configuration such that said air swirl is eliminated in said cylinder.

5. In the combination of claim 4, further comprising actuating means responsive to the engine speed and connected to said plate for rotating said member.

6. In the combination of claim 1, further comprising a plurality of cylinders each having an engine starting device, and an actuating means common to all of the devices.

References Cited in the file of this patent
UNITED STATES PATENTS
2,920,613    Vogel et al. _____ Jan. 12, 1960